United States Patent [19]

Theobald

[11] Patent Number: 5,036,489

[45] Date of Patent: Jul. 30, 1991

[54] COMPACT EXPANDABLE FOLDED FIRST-IN-FIRST-OUT QUEUE

[75] Inventor: Kevin B. Theobald, Cambridge, Mass.

[73] Assignee: CODEX Corp., Mansfield, Mass.

[21] Appl. No.: 515,303

[22] Filed: Apr. 27, 1990

[51] Int. Cl.⁵ .................... G11C 7/00; G11C 19/00; G11C 19/28

[52] U.S. Cl. ........................ 365/73; 365/78; 365/189.12; 365/221

[58] Field of Search ............. 365/73, 78, 221, 189.12, 365/219, 83

[56] References Cited

U.S. PATENT DOCUMENTS

| | | | |
|---|---|---|---|
| 3,953,838 | 4/1976 | Gilberg et al. | 365/78 |
| 4,222,102 | 9/1980 | Jansen et al. | 365/73 X |
| 4,539,657 | 9/1985 | Nicholls | 365/73 X |
| 4,639,894 | 1/1987 | Ishii | 365/189.12 |
| 4,751,675 | 6/1988 | Knaver | 365/221 X |
| 4,839,866 | 6/1989 | Ward et al. | 365/221 |
| 4,850,000 | 7/1989 | Dias | 365/189.12 X |
| 4,873,671 | 10/1989 | Kowshik et al. | 365/189.12 |
| 4,888,739 | 12/1989 | Frederick | 365/221 |
| 4,890,261 | 12/1989 | Hidaka et al. | 365/78 |

*Primary Examiner*—Alyssa H. Bowler
*Attorney, Agent, or Firm*—Robert D. Atkins

[57] ABSTRACT

An expandable first-in-first-out FIFO circuit is provided for storing data words in a plurality of data cells in response to a digital position control signal generated by a plurality of control cells such that the oldest data word is always present at the output data bus. The data cells are arranged in pairs for data transferring therebetween whereby the data words are placed in the upper and lower data cells of each pair before allocating data cells farther from the input data bus. The digital position control signal is represented as a first portion having a first logic state and a second portion having a second logic state, the boundary of which determines the occupied portion of the data cells which provides control of the movement of data words therein. The FIFO circuit is expandable without modification of the preexisting data cells or control cells simply by adding data cell pairs and associated control cells.

23 Claims, 5 Drawing Sheets

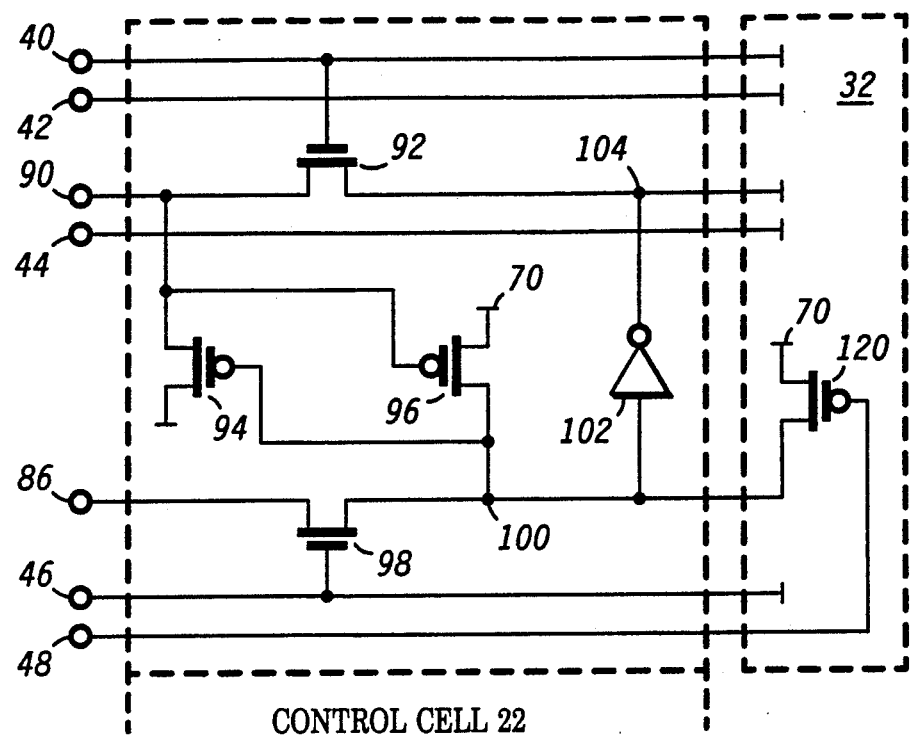
FIG. 4A
FIG. 4B
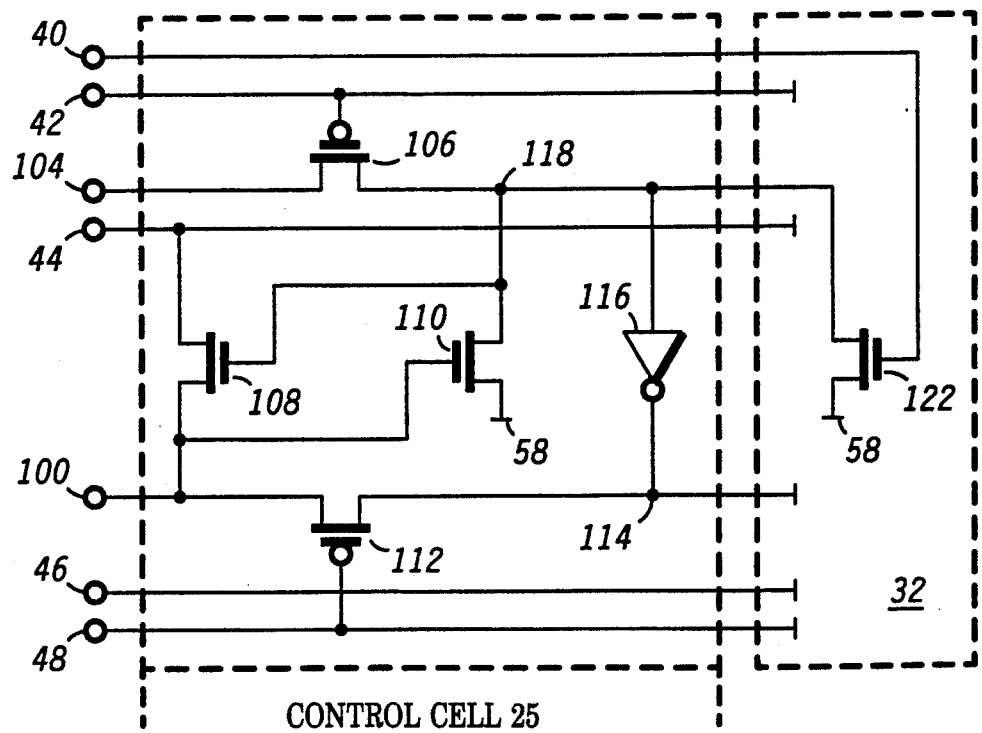

COMPACT EXPANDABLE FOLDED FIRST-IN-FIRST-OUT QUEUE

BACKGROUND OF THE INVENTION

This invention relates in general to first-in-first-out (FIFO) circuits, and more particularly, to a FIFO circuit wherein the data storage capacity is easily expandable without imposing design modifications on the preexisting control circuitry and arranged such that the oldest data at the head of the queue is always located in a predetermined register.

First-in-first-out circuits can be found in a myriad of applications in which there is a need to store data for a period of time and later read the same data while preserving the incoming order. One such application is in the field of data communications, for example a modem circuit, wherein a burst of data may be written to the FIFO at a high data rate, possibly from a computer interface clocked at 10 MHz, and read at a much slower data rate for transmission over a conventional communication link operating at say 9600 baud or higher. The temporary storage provided by the FIFO circuit allows the computer interface to dump the burst of data therein and return to performing other processing tasks. The modem circuit may then clock the data out at an convenient lower transmission frequency and interrupt the computer when it is ready for the next data burst.

A conventional FIFO circuit may comprise a predetermined number N of serially coupled registers wherein each register is M-bits wide, M and N being positive integers. An M-bit data word is written to the data input of the FIFO and any existing data is shifted to the next higher position such that the oldest data occupies the highest position that is farthest from the input data bus. A counter is incremented with each M-bit data word added to the FIFO in order to keep track of the highest data position, i.e., the head of the queue, and may be decoded via address logic at any point in time. Typically, there are N address decode circuits, one for each register in the FIFO. During the read cycle, the counter identifies the head of the queue through the address decode logic and the M-bit data word stored therein is read from the decoded position after which the counter is decremented. One of the disadvantages of the aforedescribed conventional FIFO circuit is the requirement to read the counter, decode the address of the highest data position and read the M-bit data word. The process requires multiple clock cycles to perform the series of operations thereby increasing the total data access time. Moreover, the address decoder must have high power drivers which are precharged to provide sufficient drive along the data read lines. The precharging of the data read lines also requires extra clock cycles and slows the performance of the FIFO.

Another distinct disadvantage of the prior art FIFO is the difficulty associated with expanding the length, the value of N. In general, it is necessary to increase the width of all address decode logic as the length of the FIFO increases. For example, if the FIFO control circuitry was originally designed with 8-bits for addressing 256 register locations (N=256) and later a design modification called for additional length of 256 (total 512) in the FIFO, then since each decode circuit is the same width, all 512 address decode circuits including the original 256 must be relayed-out for 9-bits of addressing range to accommodate the increased data storage capacity. Hence, the scheme using address decoding of the highest position is inconvenient, consumes excessive power and inhibits design flexibility especially when attempting to expand the capacity thereof.

Hence, what is needed is an improved FIFO circuit which is expandable without modification in the preexisting control circuit and arranged such that the oldest data position is always at a predetermined register location thereby eliminating the need for the address decoding to find the head of the queue.

SUMMARY OF THE INVENTION

Accordingly, an objective of the present invention is to provide an improved FIFO circuit.

Another objective of the present invention is to provide an improved FIFO circuit comprising a plurality of data cells for storing data words in the same order as received and a plurality of control cells for enabling the transfer of data words between the data cells such that the oldest data word is always provided at a predetermined location.

A further objective of the present invention is to provide an improved FIFO circuit having an input data bus coupled to a first lower data cell and an output data bus coupled to a second upper data cell wherein the first and second data cells form a data cell pair coupled together for allowing data transfers therebetween.

Still another objective of the present invention is to provide an improved FIFO circuit wherein the remaining data cells are also arranged in pairs and coupled for data transferring therebetween such that the data words are placed in the upper and lower data cells of each pair before allocating data cells farther from the input data bus.

Still another objective of the present invention is to provide an improved FIFO circuit wherein data cells are allocated such that the oldest data word is always shifted to the second upper data cell which is coupled to the output data bus, defined to be the head of the queue, irrespective of the amount of data in the FIFO or the capacity thereof.

Yet another objective of the present invention is to provide an improved FIFO circuit which is expandable.

Yet another objective of the present invention is to provide an improved FIFO circuit which may be expanded without modification of the preexisting data cells or control cells, simply by adding data cells and associated control cells.

In accordance with the above and other objectives there is provided a FIFO circuit for storing data comprising a first plurality of data cells serially coupled between an input bus and a conduction bus for storing the data therein. A second plurality of data cells are serially coupled between the conduction bus and an output bus and aligned with the first plurality of data cells and arranged such that the second plurality of data cells are coupled to adjacent ones of the first plurality of data cells for transferring data therebetween. A plurality of control cells having a plurality of outputs for providing a digital position control signal are respectively coupled to the second plurality of data cells for controlling the movement of data between the first and second plurality of data cells such that the oldest data is present at the output bus. The digital position control signal includes a first portion having a first logic state and a second portion having a second logic state, the boundary of which determines the occupied portion of the first and second plurality of data cells.

In another aspect, the present invention comprises a plurality of control cells having a plurality of outputs for providing a digital position control signal in response to first, second, third, fourth and fifth control signals applied thereto. The digital position control signal includes a first portion having a first logic state and a second portion having a second logic state, wherein the first portion having the first logic state increases in length while the second portion having the second logic state decreases in length when the second control signal is actuated before the fourth control signal, and the first portion having the first logic state decreases in length while the second portion having the second logic state increase in length when the fourth control signal is actuated before the second control signal. Furthermore, the first portion having the first logic state increases in length while the second portion having the second logic state decreases in length when the third control signal is actuated before the first control signal, and the first portion having the first logic state decreases in length while the second portion having the second logic state increases in length when the first control signal is actuated before the third control signal. The fifth control signal operates to reset the digital position control signal to a predetermined state.

BRIEF DESCRIPTION OF THE DRAWINGS

FIGS. 4a and 4b are schematic and block diagrams illustrating the preferred embodiment of the termination cells.

DETAILED DESCRIPTION OF THE PREFERRED EMBODIMENT

Figure 1:
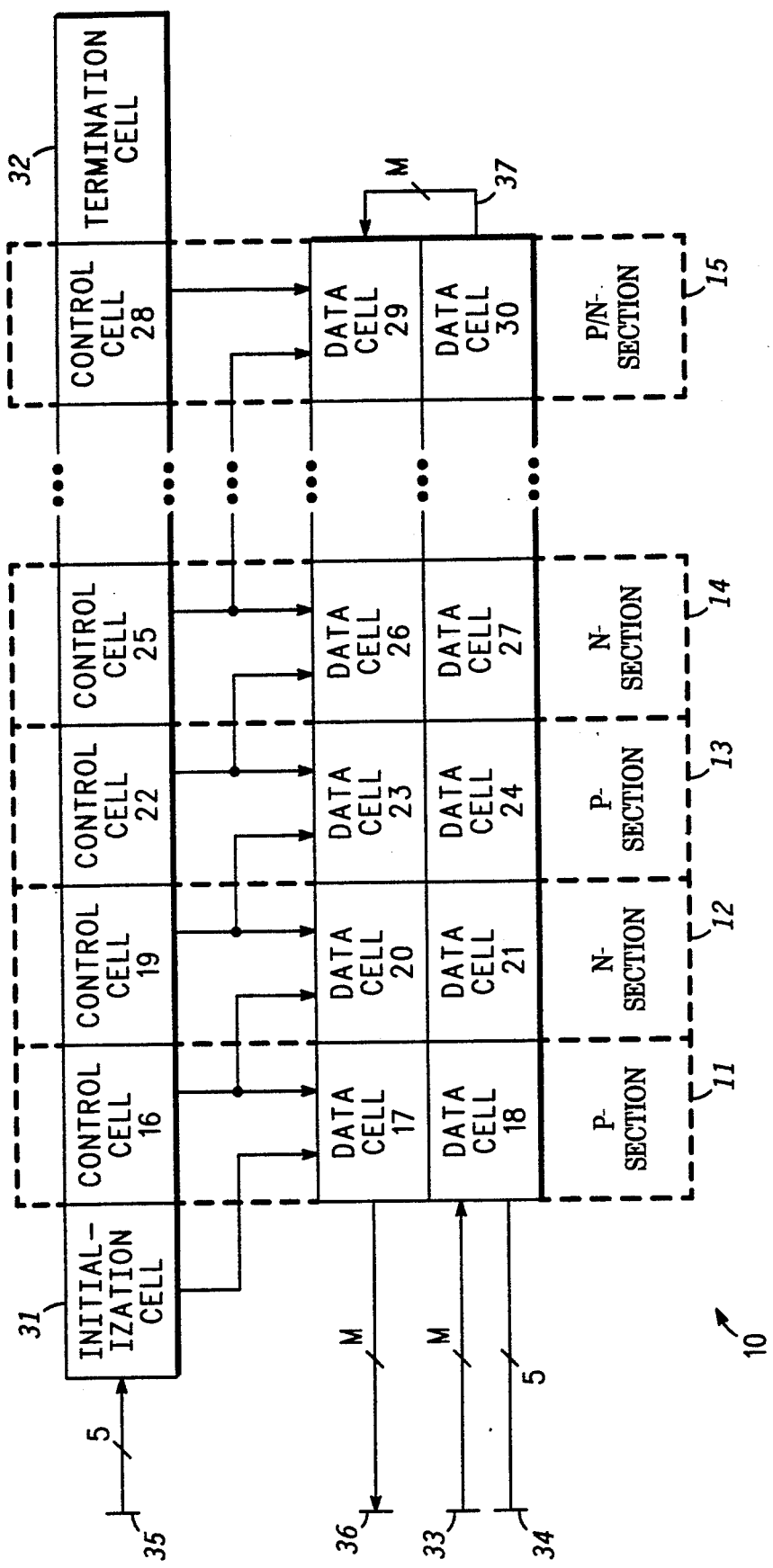
FIG. 1 is a simplified block diagram illustrating the preferred embodiment of the present invention.

In FIG. 1 there is shown FIFO 10 suitable for manufacturing as an integrated circuit using conventional integrated circuit processing techniques. The embodiment of FIFO 10 comprises of a plurality of serially coupled sections such as P-section 11, N-section 12, P-section 13, N-section 14 and P/N section 15 which may be either type depending on the storage capacity thereof. Each section comprises a control cell and upper and lower data cells such as control cell 16, upper data cell 17 and lower data cell 18 for P-section 11. Likewise, N-section 12 comprises control cell 19 and data cell pair 20 and 21, and P-section 13 includes control cell 22 and data cell pair 23 and 24, while N-section 14 comprises control cell 25 and data cell pair 26 and 27, and P/N section 15 includes control cell 28 and data cell pair 29 and 30. Control cells 16, 19, 22, 25 through 28 are serially coupled between initialization cell 31 and termination cell 32 as shown in FIG. 1. Within each P- and N-section, the control cell is coupled to the upper data cell while the adjacent data cells are coupled together to allow for the transfer of a data word therebetween. For example, control cell 16 is coupled to data cell pair 17 and 18 for providing a position control signal thereto while data cells 17, 18, 20 and 21 are coupled together whereby a data word may be transferred therebetween. An M-bit data word typically 1, 8 or 16 bits wide is applied at input bus 33 that is the data input of data cell 18 although M may assume any positive integer value. The data words are read from data cell 17 via output bus 36. Additional control signals are applied at input 34 and input 35 and bussed throughout the data cells and control cells, respectively, for controlling various operations of FIFO 10.

FIFO 10 is defined to always be in one of two possible states: even state when an even number of unique data words are stored therein, and odd state for an odd number of data words. Two-phase clock signals C1 and C2 are provided working in cooperation and operating at a predetermined frequency, say 21.6 KHz, for generating the control signals. Clock signals C1 and C2 have nonoverlapping duty cycles such that the respective edges occur at different points in time. The phasing between clock signals C1 and C2 is technology dependent upon the switching speed of the data cells.

The operation of FIFO 10 is discussed in three parts. First, the movement of the data words from data cell to data cell is introduced for a conceptual understanding thereof. Second, the discussion continues with disclosure of control cells 16, 19, 22 and 25, followed by the third part which is a detailed examination of the data cells using data cells 17 and 18 and data cells 20 and 21 as exemplary pairs. In general, the M-bit data words applied at input bus 33 are propagated through the data cells such that the oldest data word is always available in data cell 17 for reading at output bus 36. The age of a data word is measured from the time of its entrance, hence, the present invention operates as a first-in-first-out queue. Depending upon the state and contents of FIFO 10, the M-bit data word is either written into the lower data cell, or crossed-over into the upper data cell of the same pair or the next higher upper data cell. Thus, the data cells of FIFO 10 are sequentially allocated as follows: data cell 17, data cell 18, data cell 20, data cell 21, data cell 23, data cell 24, data cell 26, data cell 27 and so on.

Consider the following example wherein four M-bit data words A, B, C and D are serially written into empty FIFO 10 prior to the first read operation. An important concept to follow in this example is the scheme of maintaining the oldest data word present at output bus 36. Data transfers between data cells occur with clocks C1 and C2. In the first write cycle with FIFO 10 empty, the even state is true and data word A applied at input bus 33 is crossed-over into data cell 17 during clock C1 and written into data cell 18 during clock C2 leaving FIFO 10 in the odd state, that is, it contains one unique data word. During the odd state write cycle, the contents of data cell 18 is shifted into data cell 21 during clock C1 and data word B is stored in data cell 18 after which data word B is crossed-over into data cell 20 from data cell 18 upon clock C2 leaving data word A in data cell 17 and data word B in data cells 18 and 20. The even state is true again since two unique data words, A and B, are stored in FIFO 10. For the next write operation, data word B stored in data cell 18 is crossed-over into data cell 20 upon clock C1 and a copy of data word B is shifted into lower data cell 21 while data word C is written into data cell 18 during clock C2 leaving data word A in data cell 17, data word B in data cells 20 and 21 and data word C in data cell 18. Although this extra movement into data cell 20 is redundant, it tends to simplify the control logic. Finally during the fourth write cycle when the odd state is true, data word C is transferred to data cell 21 and data word D is written into data cell 18 during clock C1 after which data word C is crossed-over into data cell 23 during clock C2. Hence, after the four write operations, FIFO 10 contains data word A in data cell 17, data word B in data cell 20, data word C in data cells 21 and 23, and data word D in data cell 18. Thus, the general rule for write operations is to shift the contents of the lower data cells during clock C2 (i.e., from data cell 18 to data cell 21, from data cell 21 to data cell 24, etc.), leaving data cell 18 available for loading the incoming data word applied at input bus 33. For an even state write cycle, the general rule is augmented by crossing-over the data word in the lower data cell farthest from input bus 33 into the next upper data cell during clock C1, e.g., copying data word B from data cell 18 into data cell 20 during the third write cycle in the above example. Conversely for odd state write operations, the general rule is augmented by crossing-over the data word stored in the lower data cell farthest from input bus 33 into the next upper data cell during clock C2 after the data words in the lower data cells have been shifted, e.g., copying data word C from data cell 21 into data cell 23 during the fourth write cycle in the above example. The aforedescribed data movement ripples throughout the occupied portion of FIFO 10 and, albeit redundant for the even state cross-overs with non-empty data cells, this method nonetheless will simplify the overall control logic.

Upon the first subsequent read operation of the preceding example, the even state is true and data word A is read from data cell 17 with clock C1 and data words B and C are shifted into data cells 17 and 20, respectively, during clock C2 leaving data word B in data cell 17, data word C in data cells 20 and 21, and data word D in data cell 18. There is no cross-over for an even state read. The odd state is true for the second read wherein data word B is read from data cell 17 and data word C is shifted into data cell 17 upon clock C1 while data word D is crossed-over into data cell 20 from data cell 18 during clock C2 leaving data word C in data cell 17 and data word D in data cells 18 and 20. Hence, the general rule for a read operation is to read the data word in data cell 17 while shifting the data words stored in the upper data cells one position toward output bus 36. For an odd state read operation, the general rule is augmented by crossing-over the data word in the lower data cell farthest from input bus 33 into the next upper data cell during clock C2, e.g., copying data word D from data cell 18 into data cell 20 in the second read of the example above. Notably, a special case occurs when reading from a full FIFO 10. There is no cross-over copy since no location exists beyond the physical boundary; however, the physical end of the lower data cells, data cell 30, is coupled to the physical beginning of the upper data cells, data cell 29 through conduction bus 37 as shown in FIG. 1. When the contents of the upper data cells is shifted toward output bus 36, the data word provided at the output of data cell 30 is copied into data cell 29.

The preceding example describes four consecutive write operations followed by corresponding read steps to serve as an illustration of the normal mode of operation wherein FIFO 10 may receive a burst of data words possibly from a high speed computer interface (not shown) followed by lower data rate read cycles. However, since the occurrence of write and read cycles are autonomous, it is possible and, in fact common, to dynamically intermix the operations. Indeed, it is also possible to read and write at the same time provided of course that FIFO 10 contains data. For example, assume that FIFO 10 is loaded in the even state as follows: data word A is in data cell 17, data word B in data cell 20, data word C in data cells 21 and 23, data word D in data cell 18 and data word E is applied at input bus 33. For an even state simultaneous read and write operation, data word A is read from data cell 17 via output bus 36 as data word E is written into data cell 18 while, concurrent with clock C1, data words B and C are transferred into data cells 17 and 20 and data words C and D are shifted into data cells 21 and 24, respectively. During clock C2, data word D is crossed-over from data cell 21 into data cell 23 leaving data word B in data cell 17, data word C in data cell 20, data word D in data cells 21 and 23, and data word E in data cell 18. Notably, FIFO 10 remains in the even state since an even number of data words are still stored therein. Now consider an odd state simultaneous read and write operations wherein FIFO 10 is loaded as follows: data word A is in data cell 17, data word B in data cell 20, data word C in data cell 18 and data word D is applied at input bus 33. Upon clock C1, data word A is read from data cell 17 via output bus 36 as data word D is written to data cell 18, while data word B is transferred into data cell 17 and data word C is shifted to data cell 21. The next step of the odd state simultaneous read and write operation occurring during clock C2 is a departure from the previously disclosed cross-over copies, wherein data word C is copied straight up from data cell 21 into data cell 20 leaving data word B in data cell 17, data word C in data cells 20 and 21, and data word D in data cell 18. Again, FIFO 10 remains in the odd state since the total number of data words did not change. One last case involves simultaneous read and write cycles of FIFO 10 when full. Although there is no cross-over copy per se, the data word shifted out of data cell 30 is applied at the input of data cell 29 thereby effectively achieving the same result.

The previous discussion demonstrates the movement of the data words such that the oldest one is always available for reading at output bus 36. Thus, the present invention has eliminated the need to decode the address of the highest data position as is common for the serially coupled registers of the prior art and thereby improved the design and increased the performance of the FIFO circuit. In addition, the precharged read lines are no longer needed since the oldest data word is present in one predetermined location.

Figure 2:
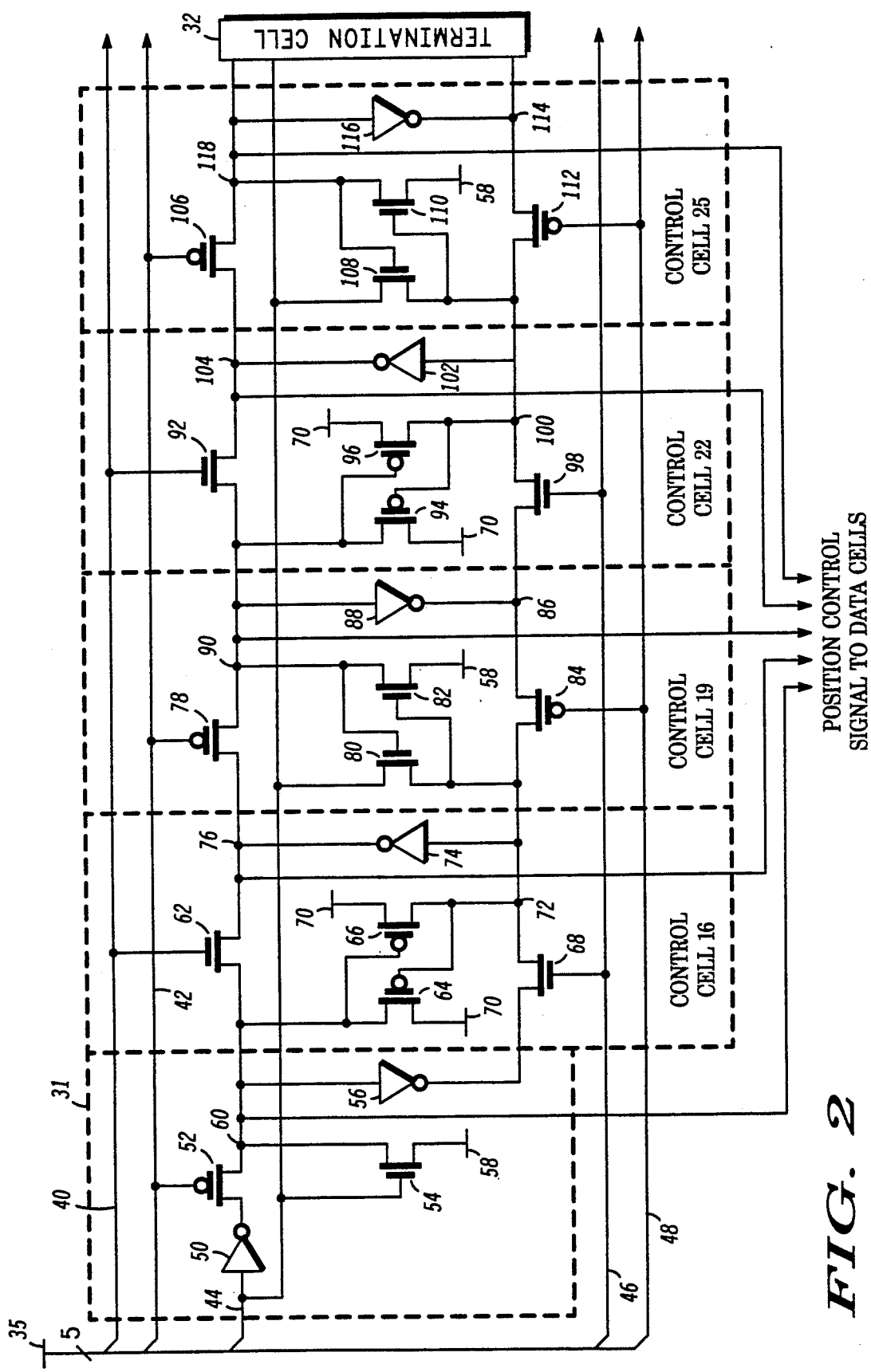
FIG. 2 is a schematic and block diagram illustrating the preferred embodiment of the control cells.

Given the aforedescribed mechanics of the data word movement between the data cells, the discussion turns toward initialization cell 30 and control cells 16, 19, 22, 25-28 as shown in FIG. 2. The function of the control cells is to maintain a digital position control signal having a first portion of logic ones and a second portion of logic zeros such as "11000 . . . ". The moveable one-zero boundary of the position control signal identifies the data cell pair the farthest away from input bus 33 containing valid data. A value of "00000 . . . " indicates an empty FIFO 10 while "11111 . . . " is reserved for the full state thereof, hence, it is understood that the length of the first and second portions of the digital position control signal may in fact be zero for the two extremes. The position control signal represented in the present snapshot "11000 . . . " comprises a first most significant bit (MSB) as the leftmost "1", a second MSB as the second leftmost "1", a third MSB as the leftmost "0", a fourth MSB as the second leftmost "0" and a fifth MSB as the rightmost "0". Thus, the first and second MSBs being in the logic one state denotes valid data in data cells 17, 18, 20 and 21 and FIFO 10 is in the even state. It is important to note that whether reading or writing, the position control signal provided at the output of control cells 16, 19, 22, 25-28 changes on even state write cycles and odd state read cycles, except as noted for the simultaneous read and write events.

Referring to FIG. 2, input 35 is shown coupled to conductors 40, 42, 44, 46 and 48, and including control signal PS1 applied at conductor 40, control signal $\overline{PS2}$ applied at conductor 42, control signal RESET applied at conductor 44, control signal PS3 applied at conductor 46 and control signal $\overline{PS4}$ applied at conductor 48. Conductor 44 is coupled to the input of inverter 50, the output of which is coupled to the source of transistor 52, while the drain of the latter is coupled to the drain of transistor 54 and to the input of inverter 56. The source of transistor 54 is coupled to power supply conductor 58 typically operating at ground potential, and the gate of transistor 54 is coupled to conductor 44, while the gate of transistor 52 is coupled for receiving control signal $\overline{PS2}$ via conductor 42. Control cell 16 comprises transistors 62, 64, 66 and 68 and inverter 74. The input of inverter 56 that is node 60 is coupled to the drain of transistor 62, the drain of transistor 64 and to the gate of transistor 66 for providing the first MSB of the position control signal which is applied at data cell 17. The sources of transistors 64 and 66 are coupled to power supply terminal 70 operating at a positive potential such as $V_{CC}$. The gate of transistor 64 and the drain of transistor 66 are coupled together to the drain of transistor 68 and to the input of inverter 74 at node 72, and the output of inverter 56 is coupled to the source of transistor 68. The output of inverter 74 is coupled to the source of transistor 62 at node 76 for providing the second MSB of the position control signal. The gate of transistor 62 is coupled to conductor 40, and the gate of transistor 68 is coupled to conductor 46.

Furthermore, control cell 19 comprises transistors 78, 80, 82 and 84 and inverter 88. The source of transistor 78 is coupled to node 76, and the drain of the same is coupled to the gate of transistor 80 and to the drain of transistor 82. The drain of transistor 80 is coupled to the gate of transistor 82 and to the drain of transistor 84 at node 72. In addition, the source of transistor 82 is coupled to power supply conductor 58, and the source of transistor 80 is coupled to conductor 44. Node 86 is formed between the source of transistor 84 and the output of inverter 88, while the input of inverter 88 is coupled to the drain of transistor 78 at node 90 for providing the third MSB of the position control signal. The gate of transistor 78 is coupled for receiving control signal $\overline{PS2}$ applied at conductor 42, and the gate of transistor 84 is responsive to control signal $\overline{PS4}$ from conductor 44.

Continuing with FIG. 2, control cell 22 comprises transistors 92, 94, 96 and 98 and inverter 102. The input of inverter 88 is coupled to the drain of transistor 92, the drain of transistor 94 and to the gate of transistor 96. The sources of transistors 94 and 96 are coupled to power supply terminal 70, while the gate of transistor 94 and the drain of transistor 96 are coupled together to the drain of transistor 98 and to the input of inverter 102 at node 100. The output of inverter 88 is coupled to the source of transistor 98 at node 86, while the output of inverter 102 is coupled to the source of transistor 92 at node 104 for providing the fourth MSB of the position control signal. The gate of transistor 92 is coupled to conductor 40, and the gate of transistor 98 is coupled to conductor 46. Moreover, control cell 25 comprises transistors 106, 108, 110 and 112 and inverter 116. The source of transistor 106 is coupled to node 104, and the drain of the same is coupled to the gate of transistor 108 and to the drain of transistor 110. The drain of transistor 108 is coupled to the gate of transistor 110 and to the drain of transistor 112 at node 100. In addition, the source of transistor 110 is coupled to power supply conductor 58, and the source of transistor 108 is coupled to conductor 44. Node 114 is provided at the interconnection of the source of transistor 112 and the output of inverter 116, while the input of inverter 116 is coupled to the drain of transistor 106 at node 118 for providing the fifth MSB of the position control signal. The gate of transistor 106 is coupled for receiving control signal $\overline{PS2}$ applied at conductor 42, and the gate of transistor 112 is responsive to control signal $\overline{PS4}$ at conductor 48. Termination cell 32 is shown coupled to control cell 25 although FIFO 10 may terminate with either a P- or N-section.

Figure 3:
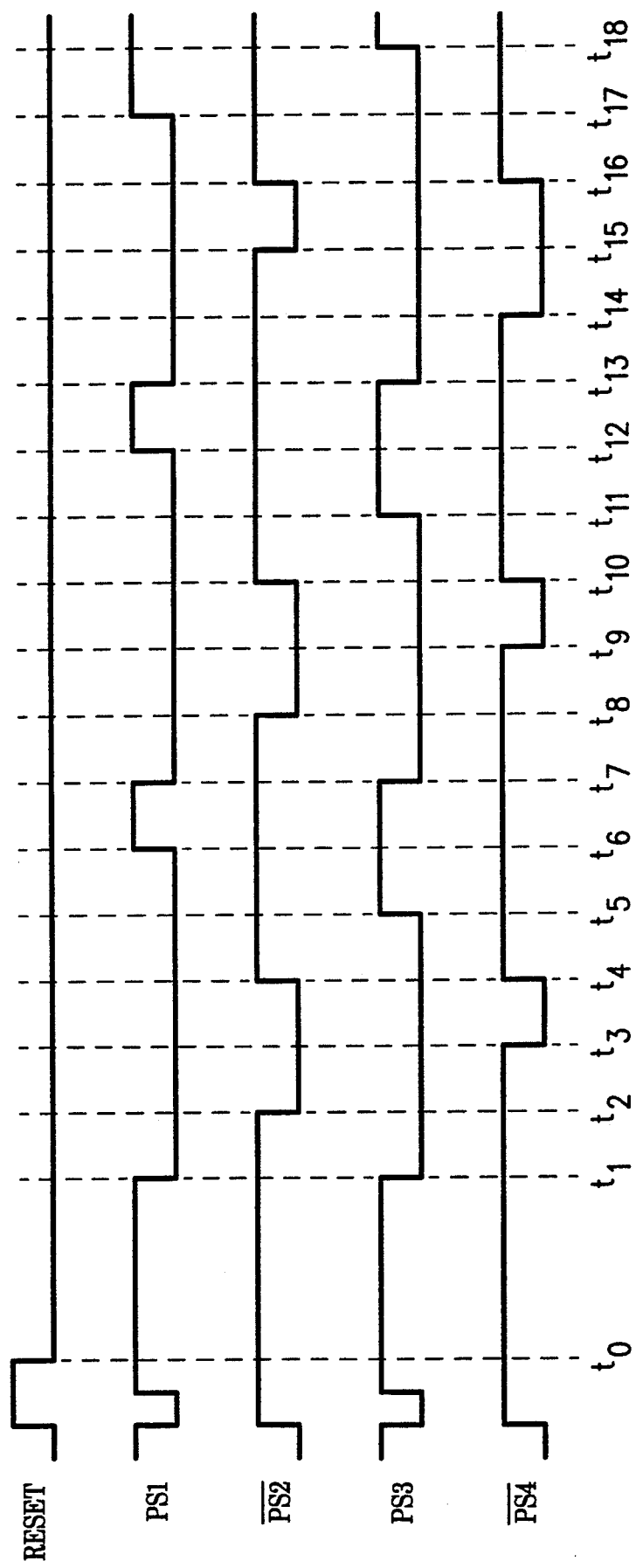
FIG. 3 is a waveform plot useful in the description of the invention.

For an explanation of the operation of control cells 16, 19, 22, 25-28, consider the following example wherein eight data words are written into FIFO 10 followed by four consecutive read cycles. Control signal RESET applied at conductor 44 is raised to logic one to initialize control cells 16, 19, 22, 25-28 to a known state and reset the position control signal provided at nodes 60, 76, 90, 104 and 118 to "00000" thereby effectively erasing the data words stored in the data cells. In addition, control signal PS1 applied at conductor 40 and control signal PS3 applied at conductor 46 may be deactivated to logic zero, while control signal $\overline{PS2}$ applied at conductor 42 and control signal $\overline{PS4}$ applied at conductor 48 are deactivated to logic one thereby turning off transistors 52, 62, 68, 78, 84, 92, 98, 106 and 112. The logic one at conductor 44 turns on transistor 54 which pulls node 60 toward the ground potential applied at power supply conductor 58 and drives the source of transistor 68 high via inverter 56. The logic zero at node 60 turns on transistor 66 and pulls node 72 to logic one causing node 76 to be driven toward logic zero by inverter 74, while the logic one at node 72 turns on transistor 82 pulling node 90 to logic zero. The process continues rippling through the control cells resulting in the upper nodes 60, 76, 90, 104 and 118, initially at logic zero (position control signal "00000") and the lower nodes 72, 86, 100 and 114 initially at logic one. Thus, initialization cell 30 initiates the preset of control cells 16, 19, 22, 25-28 to a known state upon activation of control signal RESET. Control signals PS1 and PS3 are then raised to logic one and the control signal RESET is lowered to logic zero at time $t_0$ of FIG. 3 turning off transistor 54 and enabling control cells 16, 19, 22, 25-28. FIG. 3 is a timing diagram useful in the explanation of the control cells. However, the upper and lower nodes do not change state until the read and write cycles commence due to the conduction of transistors 62, 92, 68 and 98 via control signals PS1 and PS3 which establish positive feedback clamps through, for example, transistor 66, inverter 74 and transistor 62 to maintain node 60 at logic zero and node 72 at logic one notwithstanding the leakage current discharge thereof. Similar clamps are activated in each control cell, e.g., transistor 96, inverter 102 and transistor 92 for nodes 86, 90, 100 and 104.

During the first even state write operation, the M-bit data word A is applied at input bus 33 for loaded into empty FIFO 10. At time $t_1$, control signal PS1 and PS3 applied at conductors 40 and 46, respectively, are lowered turning off transistors 62, 68, 92 and 98 and opening the corresponding positive feedback loop which was driving node 60. Control signal $\overline{PS2}$ applied at conductor 42 is activated to logic zero at time $t_2$ turning on transistors 52, 78 and 106. Since control signal RESET is logic zero, the logic one appearing at the output of inverter 50 is propagated through transistor 52 driving node 60 to logic one and the source of transistor 68 to logic zero through inverter 56, while the logic one at node 60 turns off transistor 66 removing the drive signal from node 72 although the logic one thereat remains as a capacitive charge for a short period. To drive node 72 actively, control signal $\overline{PS4}$ is lowered at time $t_3$ turning on transistors 84 and 112 and propagating the active logic one at node 86 to node 72. The active logic one at node 72 maintains the logic zero at node 76 via inverter 74 and turns on transistor 82 pulling node 90 toward the ground potential developed at power supply conductor 58. Hence, a positive feedback clamp is established for nodes 72, 76, 86 and 90 whereby the logic zero at node 90 is converted to a logic one through inverter 88 and applied at node 72 via transistor 84 while the logic one at node 72 maintains transistor 82 within conduction actively driving node 90 with logic zero completing the loop. The transition of control signal $\overline{PS4}$ at time $t_3$ marks the completion of the first write operation leaving the position control signal with the value "10000" indicating that data word A is stored in data cell 17 and the odd state is true. Control signals PS1, PS3, $\overline{PS2}$ and $\overline{PS4}$ are not exercised and the position control signal does not change during the odd state write cycle wherein data word B is loaded into data cell 18 and crossed-over into data cell 20.

The next even state write cycle for data word C begins at time $t_4$ as control signals $\overline{PS2}$ and $\overline{PS4}$ transition high to turn off transistors 52, 78, 84, 106 and 112 which removes the active drive signals from nodes 60 and 72 until time $t_5$ when control signal PS3 is raised to logic one to turn on transistors 68 and 98 and transfer the logic zero at the output of inverter 56 to node 72 which turns on transistor 64 to lock node 60 at logic one via power supply conductor 70. A positive feedback clamp is established for nodes 60, 72 and 76, that is, the logic one at node 60 is converted to a logic zero through inverter 56 and applied at node 72 via transistor 68 while the logic zero at node 72 maintains transistor 64 in conduction actively driving node 60 with logic one. However, since node 72 is now logic zero, transistor 82 is turned off and node 90 is no longer actively driven. Therefore at time $t_6$, control signal PS1 is reactivated turning on transistors 62 and 92 to again actively drive node 90 with logic zero from node 104. The second even state write cycle is complete leaving the odd state true and "11000" for the position control signal. Again, control signals PS1, PS3, $\overline{PS2}$ and $\overline{PS4}$ are not exercised during the odd state write cycle wherein data word D is loaded into data cell 18 leaving data word A stored in data cell 17, data word B in data cell 20, data word C in data cells 21 and 23 and data word D in data cell 18. It is important that there must be sufficient time separating the transitions of PS1 and PS3 control signals and the transitions of control signal $\overline{PS2}$ and $\overline{PS4}$ to ensure that no nodes are driven in opposite directions simultaneously.

During the third even state write operation the M-bit data word E is loaded into FIFO 10 following a similar scheme as described for the first even state write operation. At time $t_7$, control signal PS1 and PS3 are lowered turning off transistors 62, 68, 92 and 98 and opening the positive feedback clamps allowing nodes 72 and 90 to float. Control signal $\overline{PS2}$ is activated to logic zero at time $t_8$ turning on transistors 52, 78 and 106. The logic one at node 76 is propagated through transistor 78 to node 90 driving node 86 to logic zero and turning on transistor 80 to actively drive node 72 with the logic zero at conductor 44 since transistor 68 is temporarily turned off. The positive feedback clamp comprising transistors 78 and 80 and inverter 74 maintain nodes 72 and 86 at logic zero and nodes 76 and 90 at logic one. Control signal $\overline{PS4}$ is lowered at time $t_9$ to turn on transistors 84 and 112 and propagate the active logic one at node 114 to node 100. The active logic one at node 100 turns on transistor 110 pulling node 118 toward ground potential. The transition of control signal $\overline{PS4}$ at time $t_9$ marks the completion of the third even state write cycle leaving the position control signal with the value "11100" indicating that data word A is stored in data cell 17, data word B in data cell 20, data word C in data cells 23 and 24, data word D in data cell 21 and data word E in data cell 18. The state of FIFO 10 is odd again and data word F is loaded into data cell 18 without changing the state of the position control signal.

The fourth even state write cycle for data word G begins at time $t_{10}$ as control signals $\overline{PS2}$ and $\overline{PS4}$ transition high to turn off transistors 52, 78, 84, 106 and 112. Nodes 90 and 100 are not actively driven until time $t_{11}$ when control signal PS3 is raised to logic one turning on transistors 68 and 98 and transferring the logic zero at the output of inverter 88 to node 100 which turns on transistor 94 to lock node 90 at logic one via power supply conductor 70 and reestablish the positive feedback clamp for nodes 86, 90, 100 and 104. At time $t_{12}$, control signal PS1 is reactivated turning on transistors 62 and 92 to again actively drive node 118, and completing the fourth write operation leaving the position control signal with the value "11110". Data word H is loaded into data cell 18 upon the odd state write leaving FIFO 10 in the even state and data word A stored in data cell 17, data word B in data cell 20, data word C in data cell 23, data word D in data cell 26, data word E in data cell 27 and the next upper data cell, data word F in data cell 24, data word G in data cell 21 and data word H in data cell 18. Hence, the key feature for initiating the write cycle in the even state is the activation of control signal $\overline{PS2}$ before control signal $\overline{PS4}$ thereby turning on transistors 52, 78 and 106 and transferring the logic ones along nodes 60, 76, 90, 104 and 118, and for alternate even state writes, control signal PS3 must be activated before control signal PS1 to ensure that the logic ones at nodes 60, 76, 90, 104 and 118 are propagated away from initialization cell 31. It is not necessary to change the position control signal during the odd state writes since the data word transfers are simply filling the lower data cell of the current data cell pair.

Now the process is reversed with a read operation from the even state. There is no change in the position control signal during the even state read of data word A since data cell 26 will still contain valid data word E at the conclusion thereof. However for the subsequent odd state read of data word B, control signals PS1 and PS3 are lowered at time $t_{13}$ of FIG. 3 turning off the positive feedback clamps allowing nodes 100 and 118 to float, only this time control signal $\overline{PS4}$ is activated to logic zero at time $t_{14}$ notably before control signal $\overline{PS2}$.

The logic one at node 114 is transferred to node 100 through transistor 112 driving node 104 to logic zero via inverter 102, while the logic one at node 100 turns off transistor 94 releasing node 90. The active logic one at node 100 also turns on transistor 110 pulling node 118 toward ground potential and setting-up the clamp for nodes 100, 104, 114 and 118. Control signal $\overline{PS2}$ is activated to logic zero at time $t_{15}$ turning on transistors 52, 78 and 106 and propagating the active logic one at node 76 to node 90 thereby completing the first odd state read yielding the position control signal equal to "11100" with data word C in data cell 17, data word D in data cell 20, data word E in data cell 23, data word F in data cells 24 and 26, data word G in data cell 21 and data word H in data cell 18. Again, no change in the position control signal for the even state read of data word C.

The second odd state read cycle begins at time $t_{16}$ as control signals $\overline{PS2}$ and $\overline{PS4}$ transition high thereby removing the drive signals applied at nodes 90 and 100 until time $t_{17}$ when control signal PS1 is raised to logic one to turn on transistors 62 and 92 and transfer the logic zero at node 104 to node 90 which turns off transistor 80. At time $t_{18}$, control signal PS3 is reactivated turning on transistors 68 and 98 to again actively drive node 72. The read cycle is complete resulting in logic levels "11000" for the position control signal. Therefore, it is important for initiating the read cycle in the odd state to activate control signal $\overline{PS4}$ before control signal $\overline{PS2}$ to ensure that the logic zeroes of the position control signal are propagated toward initialization cell 31, and for alternate odd state reads, control signal PS1 must be activated before control signal PS3. As previously noted, simultaneous read and write operations never change the position control signal since the number of data words in FIFO 10 remains constant.

Turning to FIG. 4, there is shown additional detail of termination cell 32. Depending upon the selected termination point of FIFO 10, control cell 28 will either be configured as control cell 22 if an odd number of sections are implemented, or as control cell 25 if an even number of sections are used. If control cell 28 is in fact an odd cell in the serial chain, then the option shown in FIG. 4A is used. Within termination cell 32 of FIG. 4A, transistor 120 is shown including a source coupled to power supply conductor 70 and a drain coupled to node 100, while the gate of transistor 120 is coupled to conductor 48. Alternately, if control cell 28 is an even cell in the chain then the implementation shown in FIG. 4B provides the operative termination thereof. Termination cell 32 of FIG. 4B includes transistor 122 having a drain coupled to node 118 and a source coupled to power supply conductor 58. The gate of transistor 122 is responsive to control signal PS1 applied at conductor 40. In the situation where the position control signal is "... 11111" (all bits logic one), termination cell 32 provides a feature for changing the rightmost bit thereof back to logic zero. For example, assume that odd control cell 22 is the last in the chain and the drain of transistor 120 is coupled to node 100. Assume further that node 100 is logic zero and node 104 is logic one. During the read cycle, control signal $\overline{PS4}$ is lowered to turn on transistor 120 thereby applying a logic one at the input of inverter 102 and a corresponding logic zero at the output thereof to actively drive nodes 100 and 104, respectively. Likewise, transistor 122 is used to actively drive nodes 114 and 118 should a read occur when node 118 is logic one and node 114 is logic zero.

An advantage of control cells 16, 19, 22, 25-28 is readily apparent when considering the expansion of FIFO 10. In order to increase its capacity, one need only provide additional sections including control cells inserted for example between control cells 25 and 28 and associated data cell pairs thereby expanding the width of the digital position control signal accordingly. There is no modification of preexisting control cells 16, 19, 22 and 25, hence, the present invention provides improved design flexibility without imposing burdensome rework of existing control circuitry. Moreover, the true value of control cells 16, 19, 22, 25-28 may be more fully appreciated when considering their general application to other circuits aside from FIFOs. There are many applications in which an expandable, moveable boundary would be a valuable control method such as for a programmable frequency divider within a phase lock loop.

Figure 5:
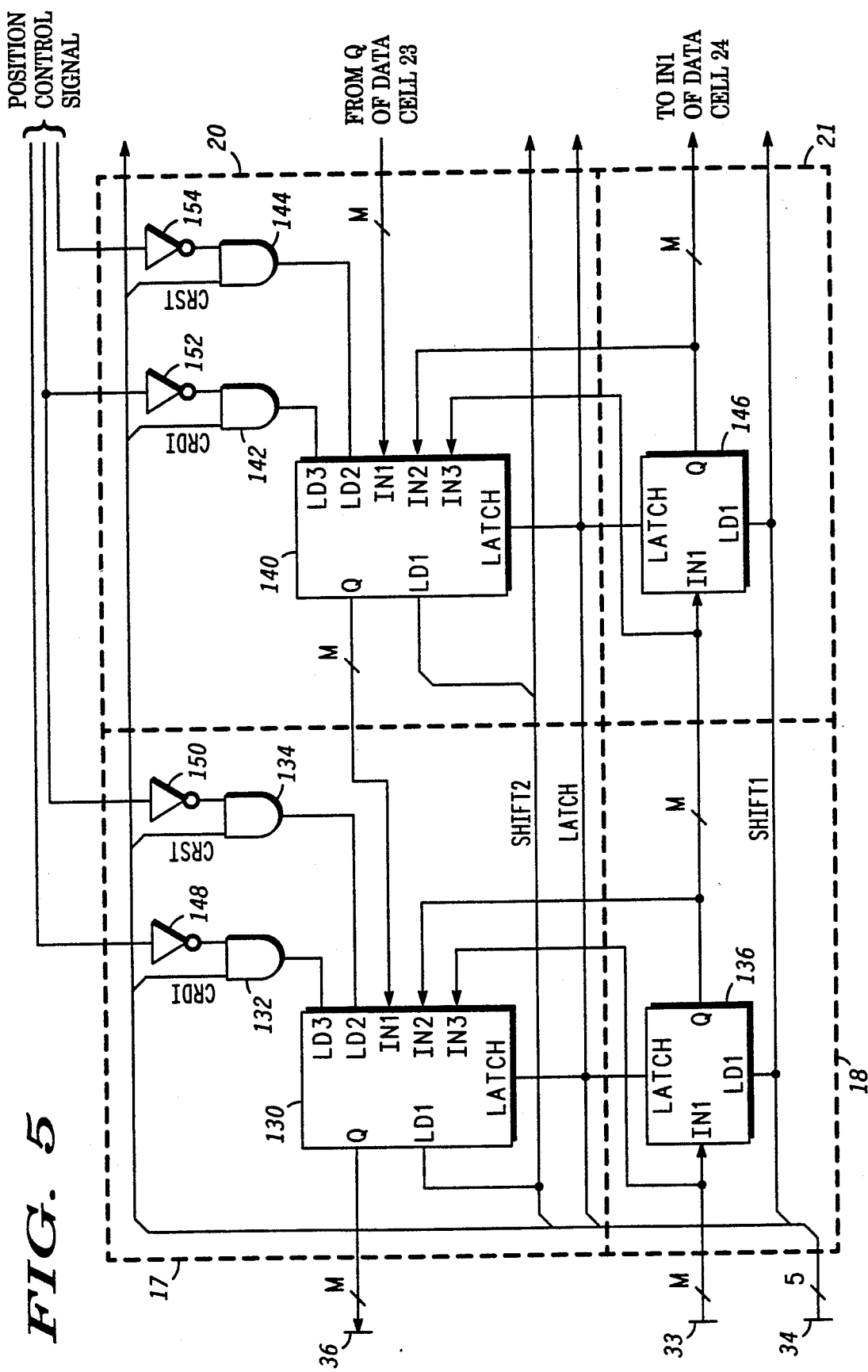
FIG. 5 is a schematic and block diagram illustrating the preferred embodiment of data cell pairs.

Referring to FIG. 5, data cell pair 17 and 18 and data cell pair 20 and 21 are shown in greater detail including master-slave flipflop 130, AND gates 132 and 134 and master-slave flipflop 136 for the former pair, while master-slave flipflop 140, AND gates 142 and 144 and master-slave flipflop 146 are provided for the latter pair. Flipflops 130 and 140 are conventional three input master-slave D-type flipflops, and flipflops 136 and 146 are one input master-slave D-type flipflops. The M-bit data word applied at input bus 33 is coupled through to the IN1 input of flipflop 136 and to the IN3 input of flipflop 130. Several control signals are applied at input 34 including control signal SHIFT1, control signal SHIFT2, control signal LATCH, clocks C1 and C2, control signal CRST and control signal CRDI. These control signals may be generated externally via state tables in cooperating with clocks C1 and C2, as is understood. Control signal SHIFT1 is applied at the LD1 inputs of flipflops 136 and 146, while control signal SHIFT2 is applied at the LD1 inputs of flipflops 130 and 140, and control signal LATCH is coupled to the LATCH inputs of flipflops 130, 136, 140 and 146. Control signal CRDI is applied at the first inputs of AND gates 132 and 142, while control signal CRST is applied at the first inputs of AND gates 134 and 144. The first MSB of the position control signal is applied through inverter 148 to the second input of AND gate 132, and the second MSB of the position control signal is applied through inverter 150 to the second input of AND gates 134. The second MSB of the position control signal is also applied through inverter 152 to the second input of AND gate 142, while the third MSB of the position control signal is applied through inverter 154 to the second input of AND gate 144. The output of AND gate 132 is coupled to the LD3 input of flipflop 130, and the output of AND gate 134 is coupled to the LD2 input of the same. The Q output of flipflop 136 and the IN2 input of flipflop 130 are coupled together to the IN1 input of flipflop 146 and to the IN3 input of flipflop 140, while the data word from the Q output of flipflop 140 is applied at the IN1 input of flipflop 130 and the data word provided at the Q output of flipflop 130 is applied at output bus 36. The output of AND gate 142 is coupled to the LD3 input of flipflop 140, and the output of AND gate 144 is coupled to the LD2 input of the same. The Q output of flipflop 146 and the IN2 input of flipflop 140 are coupled together to the IN1 input of the master-slave flipflop of data cell 24 and to the IN3 input of the master-slave flipflop of data cell 23, while the data word from the Q output of the master-slave flipflop of data cell 23 is applied at the IN1 input of flipflop 140. Flipflops 130 and 140 include separate control load inputs, LD1, LD2 and LD3 for accepting inputs from three different sources, IN1, IN2 and IN3, respectively. Data cells 23, 24, 26, 27, 29 and 30 follow a similar construction. For the corresponding AND gates of data cell 23 (not shown), the third MSB of the position control signal is also applied through an inverter to the second input of one AND gate (like gate 142), and the fourth MSB of the position control signal is applied through an inverter to the second input of another AND gate (like gate 144). Hence, the bits of the position control signal, less the first MSB, are applied at adjacent data cells.

The movement of the data words has been previously discussed from a macro level and included a detailed explanation of the position control signal. Now these two concepts are combined in the demonstration of flipflops 130, 136, 140 and 146. First consider a write operation wherein data word B is applied at input bus 33 for storage in FIFO 10 which already contains data word A in data cells 17 and 18. The position control signal is thus "10000" and the odd state is true. Recall from the previous discussion, the odd state write operation includes the steps of shifting the data words along the lower data cells with clock C1, i.e., data cell 18 to data cell 21 while loading the former with the incoming data word followed by the crossed-over copy to the next upper data cell during clock C2. Thus, the odd state write cycle begins as control signal SHIFT1 transitions high during clock C1 thereby loading the master section of flipflop 136 with data word B after which it is propagated through the slave section to the Q output thereof by control signal LATCH during clock C2. Also during clock C2, control signal CRDI changes state and combines with the inverted second MSB of the position control signal "10000" via AND gate 142 to apply the logic one provided at the output thereof to the LD3 input of flipflop 140 thereby storing data word B in its master section. The LD3 input of flipflop 130 is disabled since the first MSB of the position control signal is logic one translating to a logic zero at the output of inverter 148 and likewise at the output of AND gate 132. The internally stored data word B is propagated through the slave section of flipflops 136 and 140 when control signal LATCH is high which also occurs during clock C2. FIFO 10 is now in the even state containing data word A in flipflop 130 and data word B in flipflops 136 and 140 with the position control signal still equal to "10000" since this was an odd state write cycle.

The subsequent even state write operation of data word C includes the steps of crossing-over the data word during clock C1 followed by loading the incoming data word into the vacated data cell upon clock C2. Control signals SHIFT1 and CRDI are activated during clock C1 whereby data word B is shifted into the master section of flipflop 146 simultaneous with the movement of data word C into the master section of flipflop 136. The position control signal "10000" inhibits data movement within flipflop 130 although the inverted second MSB again combines with control signal CRDI to activate LD3 of flipflop 140 and perform the cross-over of data word B thereto. The internally stored data words B and C are propagated through the slave sections when control signal LATCH is high which occurs during clock C2 leaving data word A in flipflop 130, data word B in flipflops 140 and 146 and data word C in flipflop 136. The state of FIFO 10 is odd and the position control signal is "11000" at the conclusion of the even state write operation thereby sealing further writes to flipflop 140 via the IN3 input. The position control signal changes during clock C2 so that data word B can move to flipflop 140 before the position control signal changes.

Next consider the odd state read operation which includes the steps of reading the data word in data cell 17 while shifting data words between upper data cells during clock C1, i.e., data cell 20 to data cell 17 followed by a cross-over copy to the next upper data cell of the data word in the lower cell farthest from input bus 33 during clock C2. The odd state read cycle begins as control signal SHIFT2 transitions high during clock C1 whereby data word A is read from output bus 36 while the LD1 input of flipflop 130 is actuated to shift data word B into the master section thereof. The position control signal is changed to "10000" during clock C2 while control signal CRDI changes state and combines with the inverted second MSB of the via AND gate 142 to enable LD3 input of flipflop 140 and store data word C in its master section. The internally stored data words B and C are propagated and latched at the Q outputs with control signal LATCH. The even state read cycle is similar to the odd state read cycle, except that control signal CRDI is not activated and the position control signal does not change value. Moreover, the simultaneous read and write operation is a combination of the individual read and write cycle. Control signal CRDI is activated during clock C2 for even state simultaneous read and write while control signal CRST is activated during clock C2 for odd state simultaneous read and write operations. Control signals SHIFT1 and SHIFT2 are both enabled for clock C1 and control signal LATCH always toggles during clock C2.

Hence, what has been described is a novel FIFO circuit comprising a plurality of data cells for storing data words in the same order as received and a plurality of control cells for enabling the transfer of data words between the data cells such that the oldest data word is always available for reading at the output bus. In addition, the improved FIFO circuit is expandable with the addition of data cells and associated control cells without modification of the preexisting data cells or control cells.

I claim:

1. A circuit for storing a plurality of data bits, comprising:
   a first plurality of data cells serially coupled between an input bus and a conduction bus for storing the plurality of data bits serially applied at said input bus;
   a second plurality of data cells serially coupled between said conduction bus and an output bus and aligned with said first plurality of data cells, said second plurality of data cells being coupled to adjacent ones of said first plurality of data cells for transferring the plurality of data bits between said first and second plurality of data cells; and
   a plurality of control cells having a plurality of outputs for providing a digital position control signal to said first and second plurality of data cells for controlling the movement of the plurality of data bits between said first and second plurality of data cells such that the first received one of the plurality of data bits serially applied at said input bus is available at said output bus while the remaining ones of the plurality of data bits fill said first and second plurality of data cells in a predetermined manner toward said conduction bus, said digital position control signal including a first portion of varying length having a first logic state and a second portion of varying length having a second logic state, said first and second portions of the digital position signal forming a single moveable boundary which identifies the occupied portion of said first and second plurality of data cells.

2. The circuit of claim 1 wherein said digital position control signal is responsive to first, second, third, fourth and fifth control signals applied to said plurality of control cells, said first portion having the first logic state increasing in length while said second portion having the second logic state decreases in length when said second control signal is actuated before said fourth control signal, said first portion, having the first logic state decreasing in length while said second portion having the second logic state increases in length when said fourth control signal is actuated before said second control signal.

3. The circuit of claim 2 wherein said first portion having the first logic state increases in length while said second portion having the second logic state decreases in length when said third control signal is actuated before said first control signal, said first portion having the first logic state decreasing in length while said second portion having the second logic state increases in length when said first control signal is actuated before said third control signal, said fifth control signal operating to reset said digital position control signal to a predetermined state.

4. The circuit of claim 1 wherein the number of occupied ones of said first and second plurality of data cells are equal or differ by one.

5. The circuit of claim 4 wherein one of the plurality of data bits serially applied at said input bus is first placed in one of first plurality of data cells coupled to said input bus and then transferred to other ones of the first plurality of data cells followed by a shift to one data cell of said second plurality of data cells as determined by said digital position control signal continuing toward said output bus.

6. A circuit for storing a plurality of data bits, comprising:
   a first plurality of data cells serially coupled between an input bus and a conduction bus for storing the plurality of data bits serially applied at said input bus;
   a second plurality of data cells serially coupled between said conduction bus and an output bus and aligned with said first plurality of data cells, said second plurality of data cells being coupled to adjacent ones of said first plurality of data cells for transferring the plurality of data bits between said first and second plurality of data cells; and
   a plurality of control cells having a plurality of outputs for providing a digital position control signal to said first and second plurality of data cells for controlling the movement of the plurality of data bits between said first and second plurality of data cells such that the first received one of the plurality of data bits serially applied at said input bus is available at said output bus while the remaining ones of the plurality of data bits fill said first and second plurality of data cells in a predetermined manner toward said conduction bus, said digital position control signal including a first portion of varying length having a first logic state and a second portion of varying length having a second logic state, said first and second portions of the digital position signal forming a single moveable boundary which identifies the occupied portion of said first and second plurality of data cells, wherein a first one of said plurality of control cells comprises, (a) a first transistor having a gate, a drain and a source, said gate being responsive to a first control signal, said drain being coupled to a first one of said second plurality of data cells, said source being coupled to said a second one of said second plurality of data cells, (b) a second transistor having a gate, a drain and a source, said drain being coupled to said drain of said first transistor, said source being coupled to a first source of operating potential, (c) a third transistor having a gate, a drain and a source, said gate being coupled to said drain of said second transistor, said source being coupled to said first source of operating potential, said drain being coupled to said gate of said second transistor, (d) a fourth transistor having a gate, a drain and a source, said gate being responsive to a second control signal, said drain being coupled to said gate of said second transistor, and (e) a first inverter having an input coupled to said drain of said fourth transistor and having an output coupled to said source of said first transistor.

7. The circuit of claim 6 wherein a second one of said plurality of control cells comprises:
   a fifth transistor having a gate, a drain and a source, said gate being responsive to a third control signal, said source being coupled to said output of said first inverter, said drain being coupled to a third one of said second plurality of data cells;
   a sixth transistor having a gate, a drain and a source, said gate being coupled to said drain of said fifth transistor, said source being coupled to a fourth control signal, said drain being coupled to said input of said first inverter;
   a seventh transistor having a gate, a drain and a source, said gate being coupled to said drain of said sixth transistor, said source being coupled to a second source of operating potential, said drain being coupled to said gate of said sixth transistor;
   an eighth transistor having a gate, a drain and a source, said gate being responsive to a fifth control signal, said drain being coupled to said input of said first inverter; and
   a second inverter having an input coupled to said drain of said fifth transistor and having an output coupled to said source of said eighth transistor.

8. The circuit of claim 7 wherein said plurality of control cells further comprises an initialization cell coupled to one end of said plurality of control cells, said initialization circuit including:
   a third inverter having an input responsive to said fourth control signal and having an output;
   a ninth transistor having a gate, a drain and a source, said gate being responsive to said third control signal, said source being coupled to said output of said third inverter, said drain being coupled to said drain of said first transistor;
   a tenth transistor having a gate, a drain and a source, said gate being coupled for receiving said fourth control signal, said drain being coupled to said drain of said ninth transistor, said source being coupled to said second source of operating potential; and a fourth inverter having an input coupled to said drain of said ninth transistor and having an output coupled to said source of said fourth transistor.

9. The circuit of claim 8 wherein said plurality of control cells further comprises a termination cell coupled to a last cell of said plurality of control cells opposite that of said initialization cell, said termination circuit including an eleventh transistor having a gate, a drain and a source, said gate being responsive to said fifth control signal, said source being coupled to said first source of operating potential, said drain being coupled to the input of the inverter of said last cell of said plurality of control cells.

10. The circuit of claim 8 wherein said plurality of control cells further comprises a termination cell coupled to a last cell of said plurality of control cells opposite that of said initialization cell, said termination cell including an eleventh transistor having a gate, a drain and a source, said gate being responsive to said first control signal, said source being coupled to said second source of operating potential, said drain being coupled to the input of the inverter of said last cell of said plurality of control cells.

11. The circuit of claim 8 wherein said first one of said second plurality of data cells comprises:

a first flipflop having first, second and third inputs and first, second and third load control inputs and having an output, said third input being coupled to said input bus, said first input being coupled to the output of said second one of said second plurality of data cells, said first load control input being responsive to a sixth control signal, said output being coupled to said output bus;

a first logic gate having first and second inputs and having an output, said first input being coupled for receiving a seventh control signal, said output being coupled to said third load control input of said first flipflop;

a fifth inverter having an input coupled to said drain of said first transistor and having an output coupled to said second input of said first logic gate;

a second logic gate having first and second inputs and having an output, said first input being coupled for receiving an eighth control signal, said output being coupled to said second load control input of said first flipflop; and a sixth inverter having an input coupled to said source of said first transistor and having an output coupled to said second input of said second logic gate.

12. The circuit of claim 11 wherein a first one of said first plurality of data cells comprises a second flipflop having an input, a load control input and an output, said input being coupled to said input bus, said output being coupled to said second input of said first flipflop, said load control input being coupled for receiving a ninth control signal.

13. A circuit comprising a plurality of control cells having a plurality of outputs for providing a digital position control signal in response to first, second, third, fourth and fifth control signals applied thereto, said digital position control signal including a first plurality of bits adjacent to one another and each having a first logic state and a second plurality of bits adjacent to one another and each having a second logic state forming a single moveable boundary indicator, said first plurality of bits having said first logic state increasing in length while said second plurality of bits having said second logic state decreasing in length when said second control signal is actuated before said fourth control signal, said first plurality of bits having said first logic state decreasing in length while said second plurality of bits having said second logic state increases in length when said fourth control signal is actuated before said second control signal.

14. The circuit of claim 13 wherein said first portion having the first logic state increases in length while said second portion having the second logic state decreases in length when said third control signal is actuated before said first control signal, said first portion having the first logic state decreasing in length while said second portion having the second logic state increases in length when said first control signal is actuated before said third control signal, said fifth control signal operating to reset said digital position control signal to a predetermined state.

15. The circuit of claim 14 wherein a first one of said plurality of control cells comprises:

a first transistor having a gate, a drain and a source, gate being responsive to said first control signal, said drain being coupled to a first one of said plurality of outputs, said source being coupled to a second one of said plurality of outputs;

a second transistor having a gate, a drain and a source, said drain being coupled to said drain of said first transistor, said source being coupled to a first source of operating potential;

a third transistor having a gate, a drain and a source, said gate being coupled to said drain of said second transistor, said source being coupled to said first source of operating potential, said drain being coupled to said gate of said second transistor;

a fourth transistor having a gate, a drain and a source, gate being responsive to said third control signal, said drain being coupled to said gate of said second transistor; and a first inverter having an input coupled to said drain of said fourth transistor and having an output coupled to said source of said first transistor.

16. The circuit of claim 15 wherein a second one of said plurality of control cells comprises:

a fifth transistor having a gate, a drain and a source, said gate being responsive to said second control signal, said source being coupled to said output of said first inverter, said drain being coupled to a third one of said plurality of outputs;

a sixth transistor having a gate, a drain and a source, said gate being coupled to said drain of said fifth transistor, said source being coupled to said fifth control signal, said drain being coupled to said input of said first inverter;

a seventh transistor having a gate, a drain and a source, said gate being coupled to said drain of said sixth transistor, said source being coupled to a second source of operating potential, said drain being coupled to said gate of said sixth transistor;

an eighth transistor having a gate, a drain and a source, said gate being responsive to said fourth control signal, said drain being coupled to said input of said first inverter; and a second inverter having an input coupled to said drain of said fifth transistor and having an output coupled to said source of said eighth transistor.

17. The circuit of claim 16 wherein said plurality of control cells further comprises an initialization cell coupled to one end of said plurality of control cells, said initialization circuit including:
- a third inverter having an input responsive to said fifth control signal and having an output;
- a ninth transistor having a gate, a drain and a source, said gate being responsive to said second control signal, said source being coupled to said output of said third inverter, said drain being coupled to said drain of said first transistor;
- a tenth transistor having a gate, a drain and a source, said gate being coupled for receiving said fifth control signal, said drain being coupled to said drain of said ninth transistor, said source being coupled to said second source of operating potential; and
- a fourth inverter having an input coupled to said drain of said ninth transistor and having an output coupled to said source of said fourth transistor.

18. The circuit of claim 17 wherein said plurality of control cells further comprises a termination cell coupled to a last cell of said plurality of control cells opposite that of said initialization cell, said termination circuit including an eleventh transistor having a gate, a drain and a source, said gate being responsive to said fourth control signal, said source being coupled to said first source of operating potential, said drain being coupled to the input of the inverter of the last cell of said plurality of control cells.

19. The circuit of claim 17 wherein said plurality of control cells further comprises a termination cell coupled to a last cell of said plurality of control cells opposite that of said initialization cell, said termination cell including an eleventh transistor having a gate, a drain and a source, said gate being responsive to said first control signal, said source being coupled to said second source of operating potential, said drain being coupled to the input of the inverter of the last cell of said plurality of control cells.

20. The circuit of claim 13 wherein one of said plurality of control cells at said boundary between said first and second plurality of bits includes circuit means for maintaining said first state of one of said first plurality of bits.

21. An integrated first-in-first-out circuit for storing a plurality of data bits, comprising:
- a first plurality of data cells serially coupled between an input bus and a conduction bus for storing the plurality of data bits serially applied at said input bus;
- a second plurality of data cells serially coupled between said conduction bus and an output bus and aligned with said first plurality of data cells, said second plurality of data cells being coupled to adjacent ones of said first plurality of data cells for transferring the plurality of data bits between said first and second plurality of data cells; and
- a plurality of control cells having a plurality of outputs for providing a digital position control signal to said first and second plurality of data cells for controlling the movement of the plurality of data bits between said first and second plurality of data cells such that the first received one of the plurality of data bits serially applied at said input bus is available at said output bus while the remaining ones of the plurality of data bits fill said first and second plurality of data cells in a predetermined manner toward said conduction bus, said digital position control signal including a first portion of varying length having a first logic state and a second portion of varying length having a second logic state, said first and second portions of the digital position signal forming a single moveable boundary which identifies the occupied portion of said first and second plurality of data cells.

22. The circuit of claim 21 wherein a first one of said plurality of control cells comprises:
- a first transistor having a gate, a drain and a source, said gate being responsive to a first control signal, said drain being coupled to a first one of said second plurality of data cells, said source being coupled to said a second one of said second plurality of data cells;
- a second transistor having a gate, a drain and a source, said drain being coupled to said drain of said first transistor, said source being coupled to a first source of operating potential;
- a third transistor having a gate, a drain and a source, said gate being coupled to said drain of said second transistor, said source being coupled to said first source of operating potential, said drain being coupled to said gate of said second transistor;
- a fourth transistor having a gate, a drain and a source, said gate being responsive to a second control signal, said drain being coupled to said gate of said second transistor; and
- a first inverter having an input coupled to said drain of said fourth transistor and having an output coupled to said source of said first transistor.

23. The circuit of claim 22 wherein a second one of said plurality of control cells comprises:
- a fifth transistor having a gate, a drain and a source, said gate being responsive to a third control signal, said source being coupled to said output of said first inverter, said drain being coupled to a third one of said second plurality of data cells;
- a sixth transistor having a gate, a drain and a source, said gate being coupled to said drain of said fifth transistor, said source being coupled to a fourth control signal, said drain being coupled to said input of said first inverter;
- a seventh transistor having a gate, a drain and a source, said gate being coupled to said drain of said sixth transistor, said source being coupled to a second source of operating potential, said drain being coupled to said gate of said sixth transistor;
- an eighth transistor having a gate, a drain and a source, said gate being responsive to a fifth control signal, said drain being coupled to said input of said first inverter; and
- a second inverter having an input coupled to said drain of said fifth transistor and having an output coupled to said source of said eighth transistor.

* * * * *